United States Patent

[11] 3,577,133

[72] Inventors Allen E. Garfein
Woodland Hills;
Irwin B. Garfein, Los Angeles, Calif.
[21] Appl. No. 776,936
[22] Filed Nov. 19, 1968
[45] Patented May 4, 1971
[73] Assignee Engineered Data Peripherals Corporation
Santa Monica, Calif.

[54] DISC MEMORY SYSTEM INCLUDING UNITARY SUPPORT MEMBER AND PRINTED CIRCUIT BOARD
16 Claims, 3 Drawing Figs.

[52] U.S. Cl. ........................................................ 340/174.1
[51] Int. Cl. ........................................................ G11b 5/48
[50] Field of Search ........................................................ 340/174.1 (F), 174.1 (C), 174.1 (E); 179/100.2 (C), 100.2 (MI), 100.2 (P), 100.2 (CA)

[56] References Cited
UNITED STATES PATENTS

| | | | |
|---|---|---|---|
| 2,899,260 | 8/1959 | Farrano et al. ............... | 340/174.1 |
| 3,304,544 | 2/1967 | Johnson et al. ............... | 340/174.1 |
| 3,308,450 | 3/1967 | Bourdon et al. .............. | 340/174.1 |
| 3,314,057 | 4/1967 | Mogtader ..................... | 340/174.1 |
| 3,323,116 | 5/1967 | Solyst .......................... | 340/174.1 |

*Primary Examiner*—James W. Moffitt
*Assistant Examiner*—Vincent P. Canney
*Attorney*—Smyth Roston & Pavitt

ABSTRACT: The present invention is directed to a disc memory system which includes a magnetic memory disc and the companion electronics for recording and reading out the information on the memory disc and wherein the bulk of the electronics is located on a single printed circuit board mounted adjacent to and in a parallel plane to the plane of the memory disc. All of the electronics except the diode boards are on this single printed circuit board. A single unitary casting supports all of the major components of the disc memory system such as the motor, shaft, magnetic heads, etc., and all of the major tolerances which must be maintained in order to insure the proper function of the interrelated parts of the disc memory system are held on this single casting. The memory disc is maintained in a first sealed compartment which is supported on the single casting and the single printed circuit board is maintained in a second sealed compartment separate from the first sealed compartment.

INVENTORS:
Irwin B. Garfein
Allen E. Garfein

By Smyth, Roston & Pavitt
ATTORNEYS

INVENTORS:
Irwin B. Garfein
Allen E. Garfein
By Smyth, Roston & Pavitt
ATTORNEYS

DISC MEMORY SYSTEM INCLUDING UNITARY SUPPORT MEMBER AND PRINTED CIRCUIT BOARD

The present invention relates to a disc memory system. Current disc memory systems are fairly complex in their construction. As an example, present disc memory systems use a plurality of castings having machined portions which castings act as the support for the various components of the disc memory system. The machined portions of the castings must be machined to exact tolerances so that when the castings are put together to form a housing the housing in combination with the other elements of the disc memory system has the desired tolerances. Such tolerances are important in a disc memory system since the memory disc itself is capable of storing large quantities of information at discrete positions around the disc which information is stored and retrieved by the magnetic heads. Therefore, the exact position of the disc relative to the magnetic heads is important at all times in order to insure that the desired information is being recorded and retrieved at the proper times and in the proper positions. It can, therefore, be seen that the mechanical tolerances for the equipment must be rather high.

Other complications with the prior-art disc memory systems are in the use of a plurality of printed circuit boards to support and interconnect the electronic portions of the disc memory system. These printed circuit boards are usually housed at a location removed from the memory disc itself. The use of a plurality of printed circuit boards complicates the size of the disc memory systems which are presently available.

The present invention is directed to a disc memory system which is simpler in construction and less expensive in cost than the current and prior-art disc memory systems. The present invention includes a single unitary major casting which supports all of the components of the entire disc memory system and encloses portions of the disc memory system. For example, the single unitary casting includes a cylindrical portion which encloses the motor and shaft upon which the memory disc is mounted. The single unitary casting also supports the magnetic heads which are used to read and write information on the memory disc. The various tolerances which provide for an accurate interrelationship and positioning between the parts of the disc memory system are all maintained on this single casting. Actually the single casting has a plurality of support surfaces and all of the desired tolerances are machined onto the support surfaces of the unitary casting in a series of simple machining operations. Since the disc memory system of the present invention does not use a plurality of castings to form a support housing, it is not possible to experience the tolerance buildup which occurs frequently with the prior-art disc memory systems.

Another advantage with the simplified disc memory system of the present invention is the use of a single printed circuit board mounted adjacent to and in a parallel plane to the plane of the memory disc to contain the bulk of the electronics of the disc memory system. Specifically, the single printed circuit board contains all of the electronics used in the recording and reproduction of information on the memory disc with the exception of the diode boards. However, the diode boards themselves are relatively trouble free and it is very infrequent that a diode board must be removed for servicing. In order to provide all of the electronics on a single printed circuit board, the simplified disc memory system of the present invention uses integrated circuits extensively.

The memory disc is actually maintained in a first sealed compartment located immediately above a support surface of the single casting. The diode boards and magnetic heads are also located in the first sealed compartment. The single printed circuit board is maintained in a second sealed compartment located above the first sealed compartment and electrical interconnection between the single printed circuit board and the diode boards and magnetic heads is provided by cables and connectors. The most frequent cause of servicing in the disc memory systems is failure in the electronic portion of the system with the exception of the diode boards. It is desirable, therefore, to allow for a rapid servicing of the disc memory system without disturbing the memory disc itself. With the disc memory system of the present invention the second sealed compartment may be opened for examination and servicing without disturbing the memory disc.

More importantly, since the bulk of the electronics is maintained on the single printed circuit board, it is possible when there is a failure in the electronics to remove the printed circuit board and replace it very promptly with a new printed circuit board so as to rapidly put the disc memory system back into operation. The defective board may then be examined and repaired without disturbing the operation of the disc memory system. It is therefore possible that when several disc memory systems of the present invention are used at a single location, an extra printed circuit board may always be maintained so that the downtime for any one of the disc memory systems is substantially reduced.

A clearer understanding of the present invention will be had with reference to the following description and drawings wherein.

Figures 1, 3:
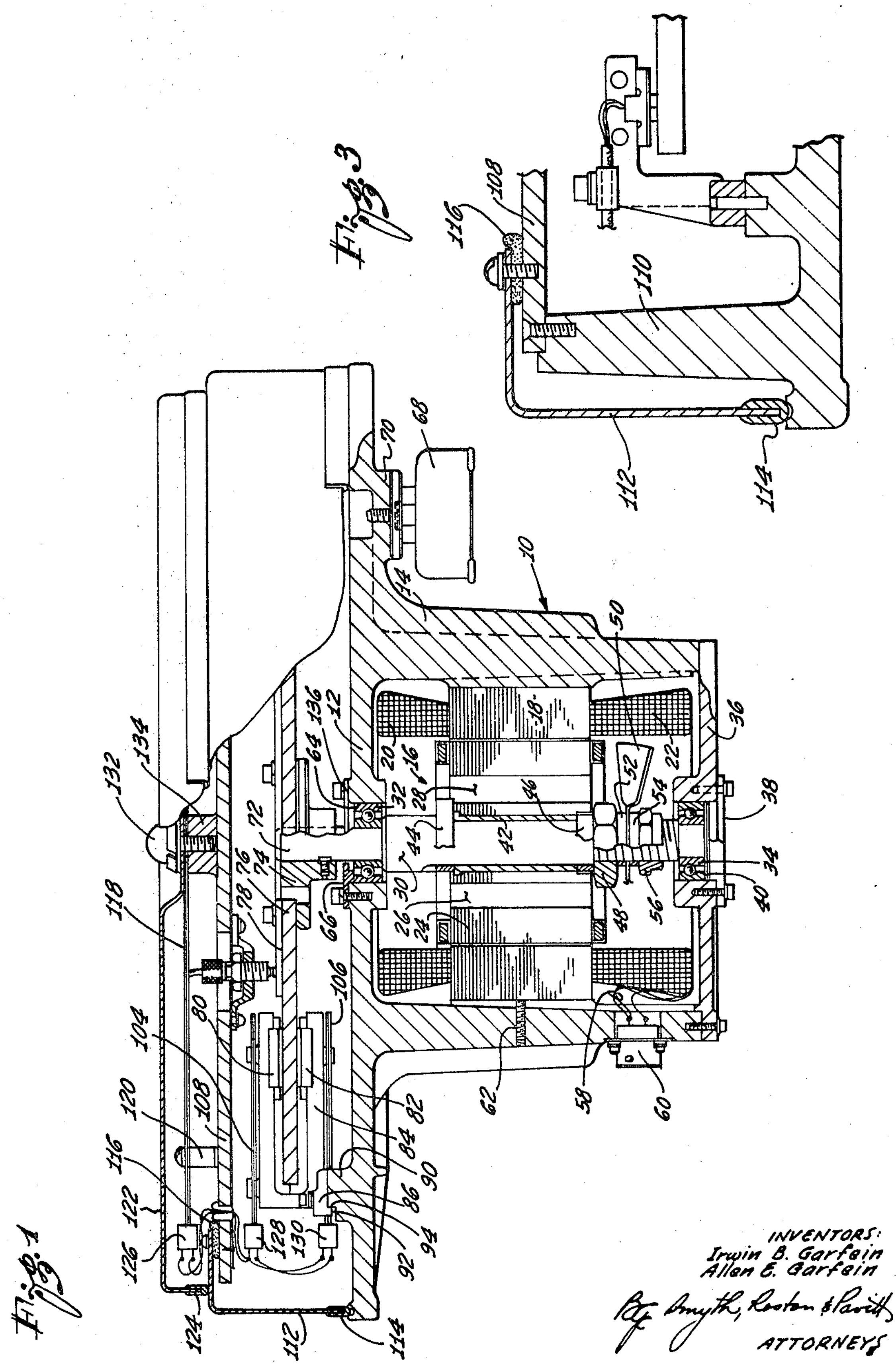
FIG. 1 is a cross-sectional view of a disc memory system constructed in accordance with the teachings of the present invention.
FIG. 3 is a fragmentary view of a portion of the disc memory system of the present invention.

In FIG. 1, the disc memory system of the present invention is shown to include as a basic structural element a main frame member 10, which member 10 is produced from a single unitary casting. The main frame member 10 is basically composed of two portions which may be defined as a flat plate structure 12 and a cylindrical member 14. The cylindrical member 14 extends downwardly from and is integral with the flat plate 12 and the cylindrical member 14 encloses an induction motor 16. The induction motor 16 includes a stator member 18, windings 20 and 22 and a rotor member 24.

The rotor member 24 includes openings 26 and 28 to allow the free flow of air, but it is to be appreciated that additional openings may be included in the rotor. The rotor is mounted on a shaft 30 and the ends of the shaft are mounted for rotation within bearings 32 and 34. Note that the bearing 34 is positioned within an opening in an end member 36, which end member is used to close off the end of the cylindrical member 14. A cap member 38 is used to close off the opening in the end member 36 and a spring member 40 may be included between the bearing 34 and the cap member 38 so as to preload the bearing 34 in the upward direction.

The rotor 24 and the shaft 30 are electrically insulated from each other using sleeve members 42, 44 and 46. A nut 48 locks the rotor 24 on the shaft 30. In order to provide for a proper cooling of the induction motor, a fan member 50 may be placed on the shaft 30 and the fan member 50 is spaced from the motor and held in position by spacers 52, 64 and nut member 56. The proper electrical power to the windings of the stator are provided by the electrical leads 58, which leads are connected to the stator windings 20 and 22 and also to a plug member 60, which plug member is designed to receive output power. A setscrew 62 may be used to lock the stator in position within the housing member 14.

The upper bearing structure 32 is contained within an opening 64 on the top plate 12. The bearing 32 is maintained in position by a plate member 66. The main frame member 10 which supports the main components of the disc memory system may itself be mounted using a shock mount 68 which is attached to a shock mount portion 70 extending from the plate 12. It is to be appreciated that the plurality of such shock mounts, for example three, is positioned around the circumference of the plate member 12 so as to support the entire disc memory system.

Supported at a top portion 72 of the shaft member 30 is a hub member 74. The hub member 74 is mounted at the end of the shaft and is used to support the memory disc. For example a memory disc 76 is mounted on the hub member 74 and is maintained in place by a top plate member 78 so that the memory disc 76 is maintained between the hub member 74 and the top plate 78. Information is recorded on and reproduced from the memory disc 76 in a plurality of tracks using a plurality of magnetic heads 80 and 82. It is to be noted that the magnetic heads are supported from a single head support member 84, which member resembles a tuning fork so that the magnetic heads 80 and 82 are positioned above and below the memory disc 76.

Figure 2:
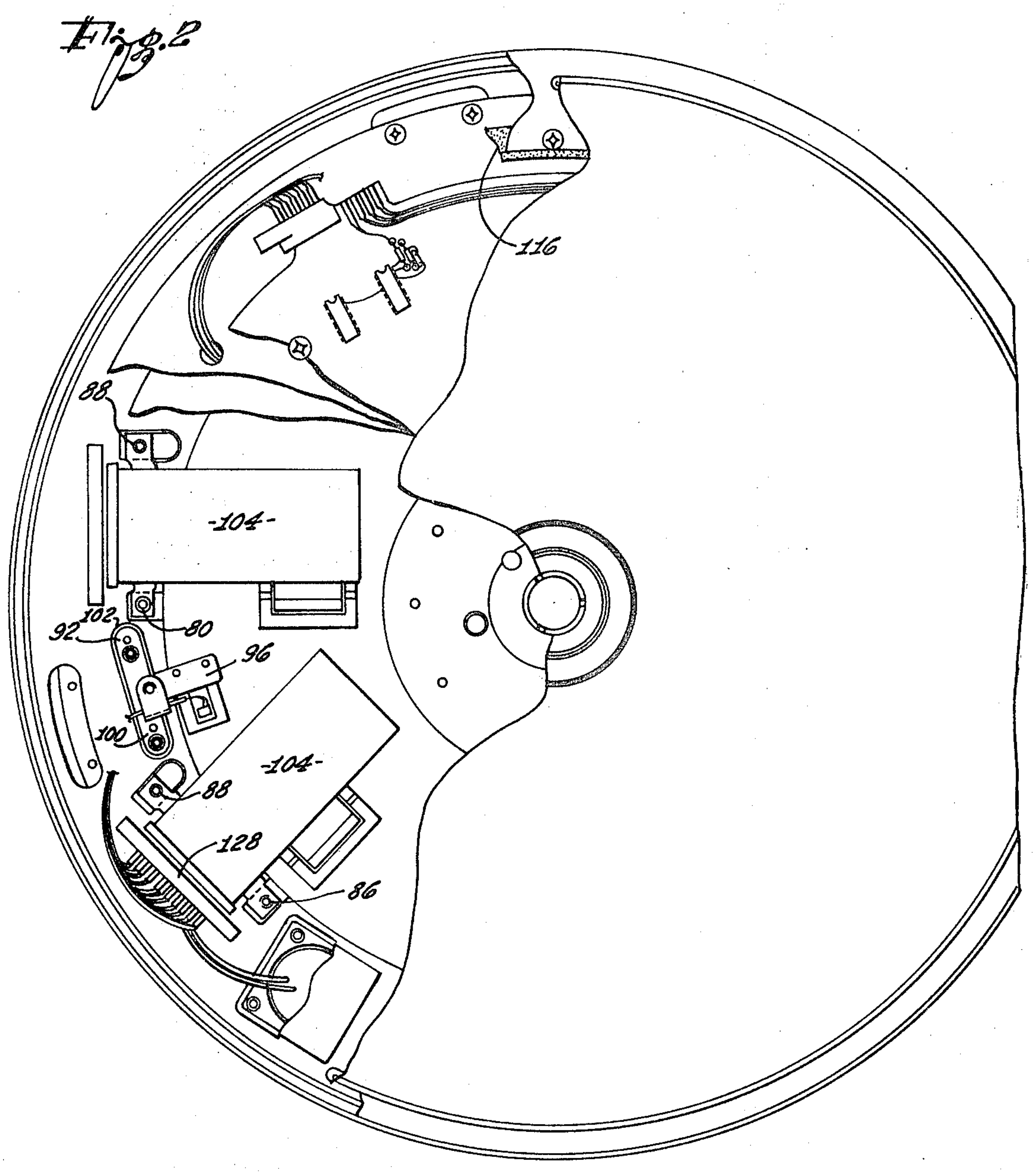
FIG. 2 is a top partially broken away view of the disc memory system of FIG. 1.

The support member 84 is maintained in position by flange members 86 and 88 which may be seen in greater detail in FIG. 2. Actually, a plurality of sets of magnetic heads are disposed at different positions around the memory disc 76. For example, eight sets of magnetic heads may be positioned at discrete positions around the memory disc 76. As shown in FIG. 2, two such sets of magnetic heads are shown. In order to provide for the proper positioning of the magnetic heads relative to the tracks on the magnetic disc, the flat plate 12 has an upstanding portion 90.

The flange members 86 and 88 each contain a lip portion 92 which extends downward to act as a stop member relative to an edge 94 of the upstanding portion 90. The actual position of the sets of magnetic heads relative to the magnetic disc is therefore determined by how deeply the edge 94 is cut into the upstanding portion 90. Therefore, in order to discretely position the sets of magnetic heads relative to the magnetic disc and at the different discrete positions around the magnetic disc 76, the faces 94 are machined to provide for eight different positions for the sets of magnetic heads. The discrete positioning of the sets of magnetic heads 80 and 82 operates to record and reproduce information on the plurality of tracks on the memory disc 76. The tracks on the memory disc 76 may be provided by an interlacing from individual ones of the sets of magnetic heads 80 and 82. Therefore, the magnetic heads in each set do not have to be very closely spaced.

In a similar structural manner as that discussed above and as shown in FIG. 2, a plurality of single track clocking heads 96 are positioned around the memory disc 76. These clocking heads 96 are supported by flange members 98 and 100, and an upstanding portion 102 similar to the upstanding portion 90 shown in FIG. 1 is used to position the heads 96. Specifically, the upstanding portion 102 may include a face portion (not shown) similar to the face 94 shown in FIG. 1 and this face portion of the upstanding portion 102 may be machined discretely at different positions so as to provide for the reproduction of different clocking tracks by the heads 96.

It can be seen that it is relatively simple to provide for the positioning of all of the heads used with the memory disc 76. Once the single unitary casting 10 is produced it is only necessary to machine the top surface of the members 90 and the members 102, and then in order to provide for the discrete positioning of the plurality of heads 80, 82 and 96 the face portions, such as the faces 94 and the face portions of the upstanding portion 102 are machined to discretely position the heads relative to the tracks on the memory disc. Therefore, the plurality of heads 80, 82 and 96 when mounted on the upstanding portions 90 and 102 are automatically positioned to provide for a recording and reproduction of information on the proper tracks on the memory disc 76.

Positioned above and below the supporting member 84 are diode boards 104 and 106. The diode boards 104 and 106 are permanently placed in position since there is rarely a failure of one of the components on a diode board. The diode boards may be printed circuit boards which contain a plurality of diodes to provide for the proper switching to the various ones of the plurality of heads 80 and 82.

An upper dust plate 108 is positioned above the memory disc 76, the plurality of magnetic heads 80, 82 and 96 and the diode boards 104 and 106. FIG. 3 illustrates in greater detail how the dust plate 108 is maintained in position by a plurality of risers 110 which extend from the top plate 12. There may be a plurality of the risers 110, for example three, so as to support the dust plate 108. A dust cover 112 as shown in FIGS. 1 and 3 is used to provide a complete seal of a first dustproof compartment containing the memory disc 76. The seal of the first dustproof compartment is completed through the use of gasket members 114 and 116. The combination of the top plate 12, the dust cover 112 and the dust plate 108, therefore, form the first sealed compartment located above the induction motor which, as indicated above, contains the memory disc 76 and, in addition, contains the magnetic heads 82 and 96 and the diode boards 104 and 106.

The bulk of the electronics for the disc memory system of the present invention is contained on a single printed circuit board 118, which printed circuit board 118 is enclosed in a second sealed compartment located adjacent to and above the first sealed compartment. The printed circuit board 118 is supported by support mounts 120, which mounts are located on the dust plate 108. A final dust cover 122 including a gasket 124 provides for the sealing of the second dustproof compartment. Therefore, the second compartment is provided by the top plate 108 and the dust cover 122. Interconnection between the single circuit board 118 and the diode boards 104 and 106 is provided by printed circuit connectors 126, 128 and 130. It is to be appreciated that a plurality of such connectors are positioned around the printed circuit board 118 so as to interconnect with the pairs of diode boards 104 and 106.

The single printed circuit board 118 as shown in the drawings is mounted adjacent to and in a parallel plane to the memory disc 76. Also, the printed circuit board 118 and the memory disc 76 are mounted in separate sealed compartments. Since most breakdowns of disc memory systems occur in the electrical components, it is possible to service the disc memory system of the present invention when there is a circuit failure by merely opening the top dust cover 122 and exposing the printed circuit board 118. As shown in FIG. 1, the top dust cover 122 is maintained in position by a single bolt member 132 which screws into a nut 134 held by the dust plate 108.

When the dust cover 122 is removed it completely exposes the single printed circuit board 118 for service and this is in contrast to prior-art disc memory systems which use a plurality of printed circuit boards which are plugged in module fashion and are difficult to service without removing several cards. As an alternative to servicing the printed circuit board of the present invention in situ, servicing may be accomplished by merely quickly replacing the single printed circuit board 118 and then sending the defective printed circuit board to the factory or to a central service location to locate the failure. This replacement of the entire electronics essentially eliminates and minimizes the downtime for the disc memory system of the present invention.

Other aspects of the present invention are the use of the main frame member 10 which is made from a single integral casting and which eliminates the tolerance buildup which occurs when the frame is composed of a plurality of parts. As can be seen, all of the major components of the disc memory system which must be maintained in close mechanical relationship are mounted off of this single integral casting. Therefore, a proper machining of various surfaces of the main frame member 10, which surfaces receive all of the interrelated components, provides for the proper physical relationship between the components.

For example, as shown in FIG. 1, the top bearing structure 32 is accurately maintained in position by a plate member 66. This plate member 66 in turn is positioned against a surface 136 and if this surface 136 is accurately machined, the top bearing structure will be exactly in place. When the top bearing structure is in place, the shaft 30, and especially the upper end 72 of the shaft, is maintained in the proper position so that when the memory disc 76 is mounted on the hub 74 the memory disc will be in the proper position. More importantly, the standing portions 90 and 102 as shown in FIGS. 1 and 3 have their surfaces machined so as to provide for the exact proper placement of the magnetic heads 80, 82 and 90.

Therefore, the he heads 80, 82 and 96 are accurately positioned to lie above and below the memory disc 76 and in addition the heads are properly positioned to extend within the memory disc so as to record and reproduce information on the proper ones of the tracks on the memory disc. The present invention provides for a relatively simple memory disc system which is easy to construct and simple to service and maintain, and therefore provides for a better memory disc system than is presently available.

Although the present invention has been disclosed with reference to a particular embodiment, various adaptations and modifications may be made and the invention is only to be limited by the appended claims.

We claim:

1. A disc memory system including a memory disc for storing information and a motor having a shaft member for providing a rotation of the memory disc, including:

a unitary main frame member including a first flat portion having a central opening and a plurality of support surfaces and a second cylindrical portion extending below the first flat portion and surrounding the central opening in a perpendicular direction to the first flat portion, means mounted within the cylindrical portion of the main frame member for supporting the motor within the cylindrical portion and with the shaft member extending through the central opening of the first flat portion to support the memory disc for rotation above the support surfaces, and a plurality of transducer means mounted on particular ones of the support surfaces and adjacent to the memory disc for use in recording information on and reproducing information from the memory disc and with the particular ones of the support surface having machined surfaces to position the transducer means at desired radial locations relative to the central opening of the first flat portion to record and reproduce the information at different radial positions on the memory disc.

2. The disc memory system of claim 1 wherein each of the plurality of transducer means is substantially identical and includes a first positioning surface and wherein each of the support surfaces includes a second positioning surface to mate with the first positioning surface of the transducer means and wherein the second positioning surfaces are machined to position the transducer means to different radial positions relative to the memory disc.

3. The disc memory system of claim 1 wherein the support surfaces are located at different positions to support the transducer means to be located circumferentially around the memory disc.

4. A disc memory system including a memory disc for storing information and a motor having a shaft member for providing a rotation of the memory disc, including:

a unitary main frame member including a first flat portion having a central opening and a plurality of support surfaces and a second cylindrical portion extending below the first flat portion and surrounding the central opening in a perpendicular direction to the first flat portion, means mounted within the cylindrical portion of the main frame member for supporting the motor within the cylindrical portion and with the shaft member extending through the central opening of the first flat portion to support the memory disc for rotation above the support surfaces, transducer means mounted on particular ones of the support surfaces and adjacent to the memory disc for use in recording information from the memory disc and with the particular ones of the support surfaces having machined surfaces to position the transducer means at desired radial locations relative to the central opening of the first flat portion to record and reproduce the information at different radial positions on the memory disc, and housing means in combination with the main frame member for enclosing the memory disc and the transducer means to provide a first dustproof enclosure for the memory disc and the transducer means.

5. The disc memory system of claim 4 additionally including electronic means located adjacent to the housing means and including means for enclosing the electronic means in a second dustproof housing located adjacent to the housing means.

6. The disc memory system of claim 4 additionally including a single printed circuit board containing a substantial portion of the electronics used to record and reproduce information on the memory disc and with the printed circuit board located adjacent to and in a parallel plane to the memory disc.

7. A disc memory system for use in recording information on and reproducing information from a memory disc, including:

a main frame member, a memory disc, first means mounted on the main frame for supporting the memory disc for rotation above the main frame, a first cover member in combination with the main frame forming a first sealed compartment containing at least the memory disc, a printed circuit board containing a substantial portion of the electronics used in controlling the recording and reproduction of the information on the memory disc, second means for supporting the printed circuit board in proximity to the memory disc and above the first cover member, and a second cover member in combination with the first cover member forming a second sealed compartment containing at least the printed circuit board.

8. The disc memory system of claim 7 wherein the main frame member includes various support surfaces to support the memory disc and a plurality of transducer means in interrelation with each other.

9. The disc memory system of claim 7 wherein the printed circuit board is in a parallel plane to the memory disc.

10. A disc memory system for use in recording information on and reproducing information from a memory disc, including:

a unitary main frame member including a plurality of support surfaces machined to desired tolerances, a memory disc, first means mounted on at least one of the support surfaces of the main frame for supporting the memory disc for rotation a particular distance above the main frame, transducer means mounted on the support surfaces and with the machined tolerances of the support surfaces providing the desired mechanical interrelationship between the transducer means and the memory disc, a first cover member in combination with the main frame forming a first sealed compartment containing at least the memory disc and the transducer means, a printed circuit board containing a substantial portion of the electronics used in controlling the recording and reproduction of the information on the memory disc by the transducer means, second means for supporting the printed circuit board in proximity to the memory disc and above the first cover member, and a second cover member in combination with the first cover member forming a second sealed compartment containing at least the printed circuit board.

11. The disc memory system of claim 10 wherein the printed circuit board is in a plane parallel to the plane of the memory disc.

12. The disc memory system of claim 10 wherein the second cover member is removable to provide access to the printed circuit board for servicing without exposing the memory disc.

13. A disc memory system for use in recording and reproducing information, including:

a memory disc for receiving information for recording on and reproducing from the memory disc, first means for mounting the memory disc for rotation in a first particular plane, a single printed circuit board including a substantial portion of the electronics for controlling the recording of information on the memory disc and the reproduction of information from the memory disc, and second means for mounting the single printed circuit board adjacent to and in a plane parallel to the memory disc.

14. The disc memory system of claim 13 additionally including means for enclosing the memory disc and the printed circuit board in separate sealed compartments.

15. A disc memory system for use in recording and reproducing information, including:

a rotatable memory disc, first means for providing a first sealed compartment for enclosing the rotatable memory disc, second means for providing a second sealed compartment adjacent to the first sealed compartment, electronic means for providing a control of the recording of the information on the memory disc and the reproduction of the information from the memory disc, and third means for mounting the electronic means within the second sealed compartment.

16. The disc memory system of claim 15 wherein the electronic means is contained on a single printed circuit board located in a plane parallel to the plane of the memory disc.